(12) United States Patent
Patel et al.

(10) Patent No.: US 11,927,102 B2
(45) Date of Patent: Mar. 12, 2024

(54) MAIN ENGINE START USING A DUAL PERMANENT MAGNET GENERATOR SYSTEM

(71) Applicant: Hamilton Sundstrand Corporation, Charlotte, NC (US)

(72) Inventors: Dhaval S. Patel, Schaumburg, IL (US); Andreas C. Koenig, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/837,362

(22) Filed: Jun. 10, 2022

(65) Prior Publication Data
US 2023/0399958 A1    Dec. 14, 2023

(51) Int. Cl.
*F01D 15/10* (2006.01)
*F02C 7/268* (2006.01)

(52) U.S. Cl.
CPC .............. *F01D 15/10* (2013.01); *F02C 7/268* (2013.01); *F05D 2220/768* (2013.01); *F05D 2260/85* (2013.01)

(58) Field of Classification Search
CPC .... F01D 15/10; F02C 7/268; F05D 2220/768; F05D 2260/85
See application file for complete search history.

(56) References Cited

U.S. PATENT DOCUMENTS

| 4,728,841 A | 3/1988 | Sugden |
| 5,512,811 A | 4/1996 | Latos et al. |
| 8,362,728 B2 | 1/2013 | Patel et al. |
| 2005/0225303 A1* | 10/2005 | Xu ........................... F02C 7/268 322/59 |
| 2006/0061319 A1* | 3/2006 | Markunas ............... H02P 21/26 318/712 |
| 2006/0087123 A1* | 4/2006 | Stout ....................... F02C 7/268 290/2 |
| 2012/0062161 A1* | 3/2012 | Patel ......................... H02P 6/18 318/400.33 |
| 2012/0299515 A1* | 11/2012 | Markunas ................. H02P 6/18 318/400.11 |

FOREIGN PATENT DOCUMENTS

CA    2598972 C    1/2013

OTHER PUBLICATIONS

Search Report issued in European Patent Application No. 23178793.8; Application filed Jun. 12, 2023; dated Oct. 10, 2023 (7 pages).

* cited by examiner

*Primary Examiner* — Joseph Ortega
(74) *Attorney, Agent, or Firm* — CANTOR COLBURN LLP

(57) ABSTRACT

An aircraft electric power generation and start system (EPGSS) includes a main machine, a starter permanent magnet generator (PMG), a generator PMG, and a carrier injection sensorless (CIS) system. The main machine selectively operates in a start mode or a generator mode. The starter PMG includes a first PMG stator and a first PMG rotor and is configured to rotate along with the shaft. The generator PMG includes a second PMG stator and a second PMG rotor configured to rotate along with the shaft. The CIS system determines one or both of a PMG voltage and a PMG current corresponding to the first PMG during the start mode, and determines a rotational position of the main rotor based on one or both of the PMG voltage and the PMG current.

20 Claims, 3 Drawing Sheets

MAIN ENGINE START USING A DUAL PERMANENT MAGNET GENERATOR SYSTEM

BACKGROUND

Embodiments of the present disclosure relate generally to aircraft electromechanical power transfer systems, and more particularly, to an aircraft electric power generation and start system.

Aircraft electric power generation and start systems (EPGSSs) can operate in a generator mode and a start mode. When operating in the generator mode, the EPGSS establishes electrical connection between an exciter and a generator control unit to deliver electrical power output from the main machine (e.g., a wound field synchronous machine) to the aircraft electrical bus. When operating in the start mode, the EPGSS connects the main machine and the exciter to a motor controller. The motor controller controls the delivery of electrical current into the exciter and the main machine to induce rotation of a shaft and generate the torque necessary for starting a gas turbine engine.

BRIEF DESCRIPTION

According to a non-limiting embodiment, an aircraft electric power generation and start system (EPGSS) is provided. The EPGSS system comprises a main machine, a starter permanent magnet generator (PMG), a generator PMG, and a carrier injection sensorless (CIS) system. The main machine is configured to selectively operate in a start mode or a generator mode. The main machine includes a main stator and a main rotor configured to rotate along with a shaft, and is electrically connected to a first rectifier. The starter PMG includes a first PMG stator, and a first PMG rotor configured to rotate along with the shaft. The generator PMG is electrically connected to a second rectifier. The generator PMG includes a second PMG stator and a second PMG rotor configured to rotate along with the shaft. The CIS system is configured to determine one or both of a PMG voltage and a PMG current corresponding to the first PMG during the start mode, and to determine a rotational position of the main rotor based on one or both of the PMG voltage and the PMG current.

Additionally or alternatively, in this or other embodiments, the CIS system comprises a sensor configured to output a sensor signal indicating one or both of the PMG voltage and the PMG current corresponding to the first PMG, and a CIS controller configured to calculate the rotational position of the main rotor based on one or both of the PMG voltage and the PMG current.

Additionally or alternatively, in this or other embodiments, the CIS controller is configured to determine multiphase coordinates of a main current flowing through the main stator and the PMG current flowing through the first PMG stator, wherein the main current and the PMG current contain selected harmonics of a CIS frequency and contain rotor position information caused by saliency of the main rotor and the first PMG rotor.

Additionally or alternatively, in this or other embodiments, the CIS controller is configured to convert the multiphase coordinates of the main current and the PMG current to respective alpha-beta coordinates and to determine a position and angular velocity of the main rotor and the first PMG rotor.

Additionally or alternatively, in this or other embodiments, the CIS controller determines a relative position between the main rotor and the first PMG rotor based on the position and the angular velocity, and a main rotor position of the main rotor is determined based on the relative position between the main rotor and the first PMG rotor.

Additionally or alternatively, in this or other embodiments, the first PMG stator and the first PMG rotor are mechanically timed to a known position relative to the main rotor and the main stator to determine the relative position.

Additionally or alternatively, in this or other embodiments, an initial position sensing algorithm determines the relative position.

Additionally or alternatively, in this or other embodiments, the CIS controller is configured to execute a CIS algorithm that calculates the position and the angular velocity of the main rotor and the first PMG rotor based at least in part on the alpha-beta coordinates.

Additionally or alternatively, in this or other embodiments, the CIS controller further comprises a motor controller in signal communication with the CIS system, the motor controller configured to control excitation of the main stator and the first PMG stator based at least in part on the rotational position of the main rotor.

Additionally or alternatively, in this or other embodiments, wherein the first PMG outputs a first AC power signal to the first rectifier during the generator mode, and wherein the second PMG output a second AC power signal to the second rectifier during the generator mode independently from the first AC power signal.

Additionally or alternatively, in this or other embodiments, wherein the first rectifier generates a first DC power signal based on the first AC power signal, and wherein the second rectifier generates a DC exciter signal based on the second AC power signal.

According to another non-limiting embodiment, a method is provided for controlling an aircraft electric power generation and start system (EPGSS). The method comprises selectively operating a main machine in one of a start mode or a generator mode, the main machine including a main stator and a main rotor configured to rotate along with a shaft, operating a starter permanent magnet generator (PMG) electrically connected to a first rectifier, the starter PMG including a first PMG stator and a first PMG rotor configured to rotate along with the shaft, and operating a generator PMG electrically connected to a second rectifier, the generator PMG including a second PMG stator and a second PMG rotor configured to rotate along with the shaft. The method further comprises determining, by a carrier injection sensorless (CIS) system, one or both of a PMG voltage and a PMG current corresponding to the first PMG during the start mode, and determining by the CIS system, a rotational position of the main rotor based on one or both of the PMG voltage and the PMG current.

Additionally or alternatively, in this or other embodiments, the method further comprises outputting, by a sensor, a sensor signal indicating one or both of the PMG voltage and the PMG current corresponding to the first PMG; and calculating, by a CIS controller included in the CIS system, the rotational position of the main rotor based on one or both of the PMG voltage and the PMG current.

Additionally or alternatively, in this or other embodiments, the method further comprises determining, by the CIS system, multiphase coordinates of a main current flowing through the main stator and the PMG current flowing through the first PMG stator, wherein the main current and the PMG current contain selected harmonics of a CIS frequency and contain rotor position information caused by saliency of the main rotor and the first PMG rotor.

Additionally or alternatively, in this or other embodiments, the method further comprises converting, by the CIS controller, the multiphase coordinates of the main current and the PMG current to respective alpha-beta coordinates; and determining, by the CIS controller, a position and angular velocity of the main rotor and the first PMG rotor.

Additionally or alternatively, in this or other embodiments, the method further comprises determining, by the CIS controller, a relative position between the main rotor and the first PMG rotor based on the position and the angular velocity; and determining, by the CIS controller, a main rotor position of the main rotor is determined based on the relative position between the main rotor and the first PMG rotor.

Additionally or alternatively, in this or other embodiments, the method further comprises determining the relative position by mechanically timing the first PMG stator and the first PMG rotor to a known position relative to the main rotor and the main stator.

Additionally or alternatively, in this or other embodiments, the method further comprises determining the relative position using an initial position sensing algorithm.

Additionally or alternatively, in this or other embodiments, the method further comprises executing, by the CIS controller, a CIS algorithm that calculates the position and the angular velocity of the main rotor and the first PMG rotor based at least in part on the alpha-beta coordinates.

Additionally or alternatively, in this or other embodiments, the method further comprises controlling, by a motor controller in signal communication with the CIS system, excitation of the main stator and the first PMG stator based at least in part on the rotational position of the main rotor; outputting, from the first PMG, a first AC power signal to the first rectifier during the generator mode; and outputting, from the second PMG, a second AC power signal to the second rectifier during the generator mode independently from the first AC power signal. The method further comprises generating, by the first rectifier, a first DC power signal based on the first AC power signal; and generating, by the second rectifier, a DC exciter signal based on the second AC power signal.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
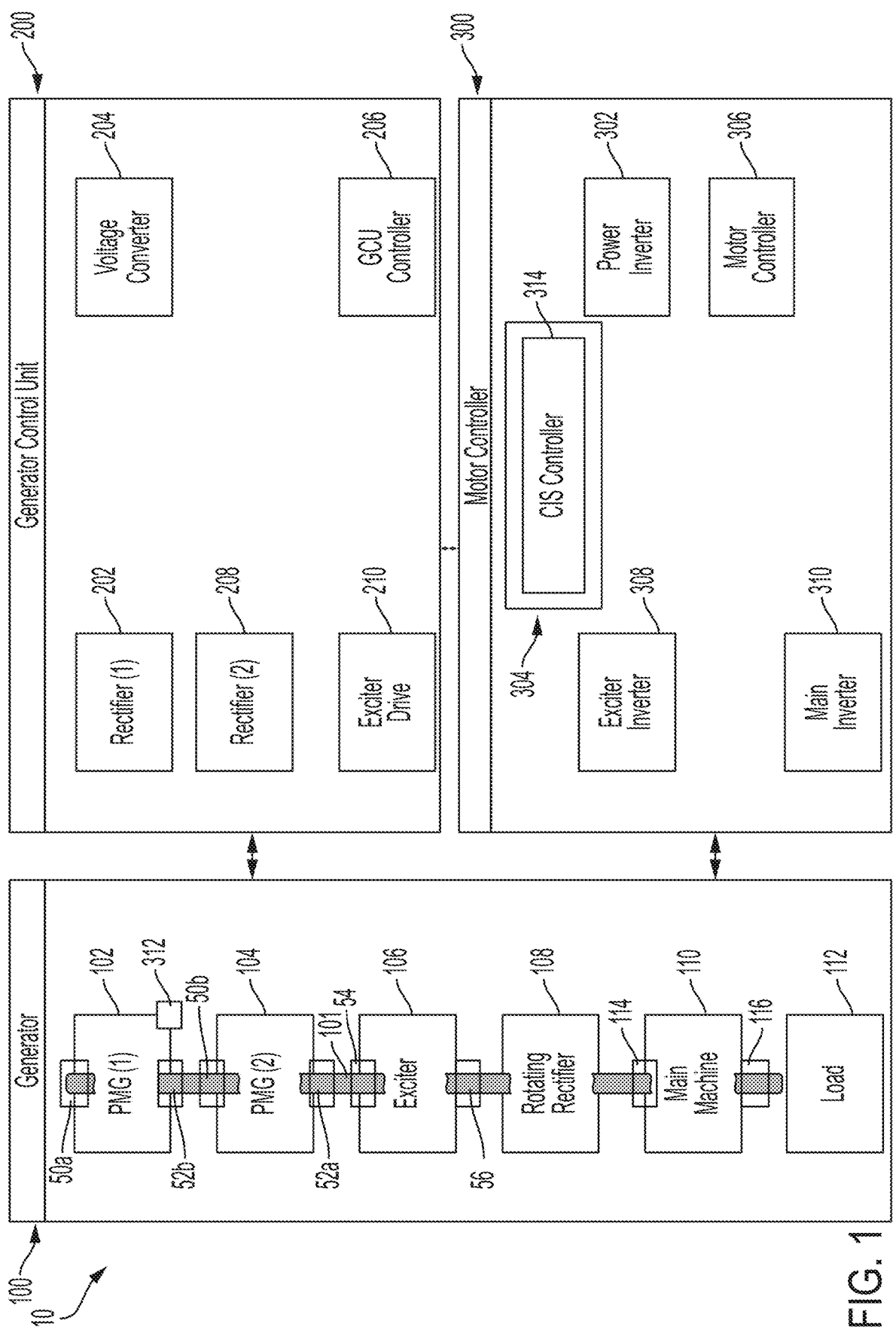
FIG. 1 is a block diagram of an aircraft electric power generation and start system according to a non-limiting embodiment of the present disclosure.

A detailed description of one or more embodiments of the disclosed apparatus and method are presented herein by way of exemplification and not limitation with reference to the Figures.

Aircraft EPGSSs employ a main machine such as a wound field synchronous machines (WFSM), for example, which can operate as both a starter/motor (e.g., in a start mode) and a generator (e.g., a generator mode) when mechanically coupled to a prime mover, such as gas turbine engine. A typical WFSM includes a rotor which contains a main field rotor winding which is provided with electrical current from an excitation system. The excitation system includes of an exciter stator and exciter rotor. Both the main field rotor and the exciter rotor are fixed to a shaft which is driven to rotate, e.g., by a prime mover. The exciter rotor rotates adjacent an exciter stator, and the main field winding rotates adjacent a main stator.

Operation of a WFSM in the generator mode utilizes the prime mover to drive the rotor shaft of the WFSM. The rotor shaft also includes or is directly coupled to a PMG rotor such that the speed of the rotor shaft is proportional to the speed of the PMG rotor. During operation as a generator, the PMG is used to provide power to drive the excitation system and to power the controllers. Operation of a WFSM in the start mode utilizes the variable speed motor drive and a solid-state power converter to process typically high potential direct current ("DC") electric power to provide variable frequency AC power input to the WFSM. For operation of a WFSM to start the prime mover and/or as a variable speed motor drive, it is necessary to know the rotational position of a WSFM main rotor to control the solid-state power converter to meet motor performance requirements.

Traditional EPGSSs are known to implement a resolver to determine rotor position. The resolver serves as a physical position sensor that provides rotor and speed position during start mode so that the motor controller can inject the correct currents into the exciter and main machine. Resolvers, however, are relatively expensive and may output unreliable measurement due to the harsh environments to which the generator is subjected. For example, the resolver may be exposed to high rotational speeds, high temperatures, excessive vibration, and chemical exposures such as aircraft turbine oils used for cooling. All of these harsh conditions can negatively affect the operation and reliability of the resolver.

Resolvers also require a thin magnet wire and laminations that have very narrow teeth for the core in order to achieve the tight packaging sizes while maintaining the accuracy. These requirements clash with the operating environment and lead to mechanical failures. In order to avoid the mechanical failures, exotic materials are required driving up cost. In some situations, however, the exotic materials reduce position sensing accuracy.

Various non-limiting embodiments of the present disclosure provide an aircraft electric power generation and start system (EPGSS), which implements a dual-PMG system that includes a starter PMG and a generator PMG. When operating in the generator mode, the starter PMG operates to generate low voltage power (e.g., about 28 Volts) that is utilized to power the generator controller while the generator PMG operates to generate exciter power that is utilized to output power from the main machine to drive one or more generator loads. During the start mode, the starter PMG operates together with the motor controller and a carrier injection sensorless ("CIS") system (sometimes referred to as a CIS observer) to determine rotor position sensing rather than implementing a physical resolver.

In one or more non-limiting embodiments of the present disclosure, the CIS system determines multiphase coordinates of currents of each of the main stator and a PMG stator included in the starter PMG. The currents contain selected harmonics of a CIS frequency and contain rotor position information caused by saliency of the main rotor and the starter PMG rotor. Accordingly, the CIS system can convert the multiphase coordinates of the currents to alpha-beta coordinates, which are then used to determine a position and angular velocity of the main rotor and the starter PMG rotor. Based on the position and angular velocity determined by the CIS system, the relative position between the main rotor and the PMG can be determined to accurately determine the main rotor position. For example, the PMG rotor and stator can be mechanically timed to a known position relative to the main machine rotor and stator. In another example, an initial position sensing algorithm can be used to determine the PMG and main machine positions before rotation. Accordingly, replacing the observer with a combination of the starter PMG, motor controller and CIS system reduces the costs and weight of aircraft, while improving both the rotor sensing precision of the EPGSS and the overall reliability the aircraft.

With reference now to FIG. 1, an aircraft electric power generation and start system (EPGSS) 10 is illustrated according to a non-limiting embodiment of the present disclosure. The EPGSS 10 includes a starter/generator 100, a generator control unit (GCU) 200, and a motor controller 300. The starter/generator 100, generator control unit (GCU) 200, and motor controller 300 are each in signal communication with one another as described in greater detail below. Accordingly, the EPGSS 10 can operate as both a starter/motor (e.g., in a start mode) and a generator (e.g., a generator mode) as described herein.

The starter/generator 100 is operable to rotationally drive a shaft 101 connected to a prime mover such as, for example, a gas turbine engine (not shown). The starter/generator 100 includes a first permanent magnet generator (PMG) 102, a second permanent magnet generator (PMG) 104, an exciter 106, a rotating rectifier 108, and a main machine 110. As described in greater detail below, the first permanent magnet generator (PMG) 102 can be referred to as a "starter PMG", while the second PMG 104 can be referred to as a "generator PMG". As described herein the starter PMG 102 in place of a resolver to determine a rotational position of the main rotor 114. In some embodiments, one of the PMGs, e.g., the starter PMG 102, can be sized smaller than the generator PMG 104 to reduce the overall weight of the aircraft.

The first PMG 102 and the second PMG 104 each include a PMG stationary winding 50a and 50b (i.e., a PMG stator), respectively, and a PMG rotor 52a and 52b (i.e., a PMG rotor), respectively, which has one or more magnets configured to generate a magnetic field. The first and second PMGs 102 and 104 each output an AC power. In some embodiments, the AC power can include, for example, a single-phase AC power, while in other embodiments the AC power can include a three-phase AC power.

The exciter 106 can be constructed, for example, as a doubly-fed asynchronous machine, which includes a three-phase stationary field winding 54 (an exciter stator 54) and a three-phase rotating armature field winding 56 (an exciter rotor 56). Energizing the exciter stator 54 induces a magnetic field that rotates relative to the exciter rotor 56, and the relative rotation of the magnetic field to the armature generates AC power that is output from the exciter 106.

The main machine 110 includes a main field winding 114 (i.e., a main rotor 114) and a main stationary winding 116 (i.e., a main stator 116). In one or more embodiments, saliencies in the main machine 110 (e.g., a main rotor 114) and in PMG rotors (not shown) in the first and second PMGs 102 and 104 can enable detection of specific harmonic currents containing rotor position information and can allows for determining a relative difference between the position of the main rotor 114 relative to the position of the PMG rotors included in the PMGs 102 and 104, without the need for a position sensor. This relative difference may then be used during operation of the starter/generator 100 to determine the position of the main rotor 114.

In one or more non-limiting embodiments, the main machine 110 is constructed as a wound field synchronous machine ("WFSM"). When operating in the generator mode, the main machine 110 generates power to drive the excitation system (e.g., the exciter 106) and to power the controllers (e.g., the GCU controller 206, the motor controller 306) and a drive one or more loads 112. When operating in the start mode, the main machine 110 can operate as a variable speed motor drive utilizing a solid-state power converter to process typically high potential direct current ("DC") electric power to provide variable frequency AC power input to the main machine 110 (e.g., to the main stator 116).

The GCU 200 includes a first rectifier 202, a voltage converter 204, a GCU controller 206, a second rectifier 208, and an exciter drive 210. The first rectifier 202 is electrically connected to the first PMG 102 and is configured to convert a first AC signal into a first DC signal. The second rectifier 208 is electrically connected to the second PMG 104 and is configured to convert a second AC signal into a second DC signal. In one or more non-limiting embodiments, the first and second rectifiers 202 and 208 are each constructed as a six-pulse rectifier that includes a filter circuit to condition a DC waveform signal.

The voltage converter 204 is configured to generate a low-voltage power that can be utilized to power the GCU controller 206. In one or more non-limiting embodiments, the voltage converter 205 is constructed as a DC-DC converter that converts a DC signal having a first voltage into a DC signal having a second voltage that is less than the first voltage.

The GCU controller 206 can include, but is not limited to, a digital signal processor (DSP) or a field programmable gate array (FPGA), and is configured to control the exciter drive 210. The exciter drive 210 is configured to output a DC signal using a DC exciter signal generated by the second rectifier 208. The GCU 206 can generate a control signal that controls operation exciter drive 210 and thus the output (e.g., the signal parameters) of the DC signal. Accordingly, the controller 206 can receive voltage and current inputs and set or control the exciter drive 210 according to excitation requirements necessary meet targeted load demands. In one or more non-limiting embodiments, the GCU controller 206 can meet the excitation requirements by generating control signals that active control or vary a duty cycle of the exciter drive 210.

The motor controller 300 includes a DC power inverter 302, a CIS system 304, a motor controller 306, an exciter inverter 308, and a main inverter 310. The DC power inverter 302 is configured to convert an input DC power signal into a position sensing excitation signal. In one or more non-limiting embodiments, the DC power inverter 302 is constructed as a three-phase switching inverter, that converts the input DC power signal into the three-phase excitation signal, which is delivered to the first PMG 102.

The CIS system 304 includes one or more sensors 312 and a CIS controller 314 (e.g., a DSP). The CIS sensors 312 are configured to measure a voltage and/or current of the first PMG 102 and output one or more sensor signals indicative of the measured voltage and/or current. Although the CIS sensors 312 are illustrated as being associated with the first PMG 102, in some embodiments additional CIS sensors can be associated with the second PMG 102 to measure and output corresponding voltage and/or current measurements of the second PMG 102.

The CIS controller 314 includes a series of filters, along with stored algorithms that when executed by the controller 314 can perform dual vector tracking observations. Based on the sensor signals, the CIS controller 314 can identify specific harmonic currents in the first PMG 102 that are indicative of rotor position information associated with the first PMG 102. Based on the position and angular velocity determined by the CIS system 304, the relative position between the main rotor 114 and the PMG 102 can be determined to accurately determine the main rotor position. For example, the PMG rotor and the PMG stator can be mechanically timed to a known position relative to the main rotor and main stator. In another example, an initial position sensing algorithm can be used to determine the relative position between PMG rotor to the main rotor before rotation, and the relative position is utilized to accurately determine the position of the main rotor. In this manner, the EPGSS 10 can determine the rotational position of the main rotor 114 during the start mode without implementing a conventional resolver. Although not illustrated, in some embodiments the CIS controller 314 can determine the rotational position of the main rotor 114 relative to the position of the PMG rotor in the second PMG 104. In one or more non-limiting embodiments, the CIS controller 314 can chose to determine the main rotor position based on the voltage and current measurements of the second PMG 104 if a fault is detected in the first PMG 102.

In one or more non-limiting embodiments, the CIS controller 314 receives alpha-beta coordinate currents indicated by the sensor signals, and executes a CIS algorithm to determine a rotor position for each of the main rotor 114 and the PMG rotor included in the first PMG 102.

According to a non-limiting embodiment, the CIS controller 314 can also rotate the alpha-beta coordinate harmonic stator current coordinates indicated by the sensors signals from a negative first harmonic to a positive second harmonic rotating reference frame. In one example the CIS controller 314 performs a north-south pole determination to determine a polarity of the detected harmonic current of the main rotor 114. Once the position of poles of each of the main rotor 114 and PMG rotor included in the first PMG 102 are determined, and the absolute position of a "North" pole of main rotor 114 is determined, the relative difference between the position of the main rotor 114 and that of the PMG rotor included in the first PMG 102 can be determined.

The motor controller 306 generates one or more controls signals that control operation of the power inverter 302, the CIS controller 314, the exciter inverter 308 and the main inverter 310. In one or more non-limiting embodiments, the motor controller 306 generates pulse width modulated (PWM) signals that control the exciter inverter 308 and the main inverter 310 during the start mode as described in greater detail below.

During the start mode, the exciter inverter 308 and the main inverter 310 are each configured to generate respective AC excitation signals. The AC excitation signal generated by the exciter inverter 308 is used to energize (i.e., "excite") the exciter 106. Likewise, the AC excitation signal generated by the main inverter 310 is used to energize (i.e., "excite") a main armature in the main machine 110.

Figure 2:
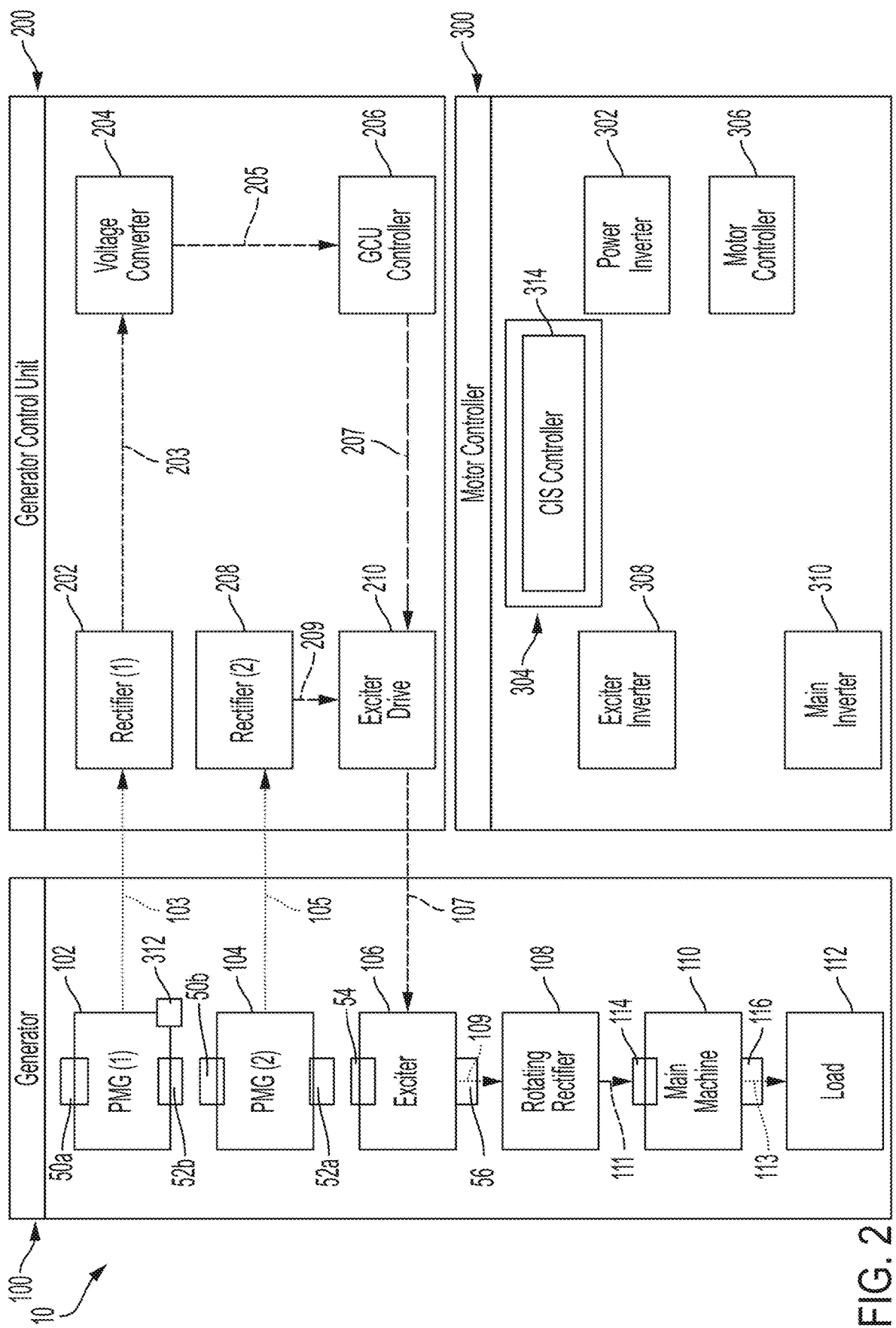
FIG. 2 illustrates the electric power generation and start system of FIG. 1 operating in a generator mode according to a non-limiting embodiment of the present disclosure.

Referring to FIG. 2, the EPGSS 10 is illustrated operating in a generator mode according to a non-limiting embodiment of the present disclosure. The first PMG 102 (e.g., the starter PMG 102) generates a first AC power signal 103, which is delivered to the first rectifier 202. The first rectifier 202 converts the first AC power signal 103 into a first DC power signal 203, and delivers it to the voltage converter 204. The first DC power signal 203 can have a voltage level ranging, for example, from about 60 volts to about 180 volts. It should be appreciated, however, that a wider voltage range can be employed without departing from the scope of the invention. The voltage converter 204 converts the first DC power signal 203 into a second DC power signal 205 having a lower voltage level, e.g., about 28 volts. Accordingly, the second DC signal 205 can be used to power the GCU controller 206.

The second PMG 104 generates a second AC power signal 105 independently from the first AC power signal 103, and delivers the second AC power signal to the second rectifier 208. The second rectifier 208 converts the second AC power signal 105 into a DC exciter signal 209 and delivers it to the exciter drive 210.

The exciter drive 210 can include a rectifier to generate a DC exciter signal 107. In one or more non-limiting embodiments, the rectifier can be constructed as a switching half bridge rectifier. Accordingly, the GCU 206 generates a control signal 207 that can control the switching timing and/or frequencies of the half bridge switches so that the duty cycle of the exciter signal 107 can be actively varied.

The exciter 106 is in signal communication with the exciter drive 210 to receive the DC exciter signal 107. The exciter 106 utilizes the DC exciter signal 107 to generate an AC power signal 109, which is output to the rotating rectifier 108. The rotating rectifier 108 converts the AC power signal 109 into the rectified DC signal 111, which is used to energize a main field rotor included the main machine 110. The main machine 110 utilizes the rectified DC signal 111 applied to the main field rotor to output AC load power 113, which drives one or more loads 112. The voltage and current of the AC load power 113 is based, at least in part, on the control of the field current generated using the exciter signal 107.

Figure 3:
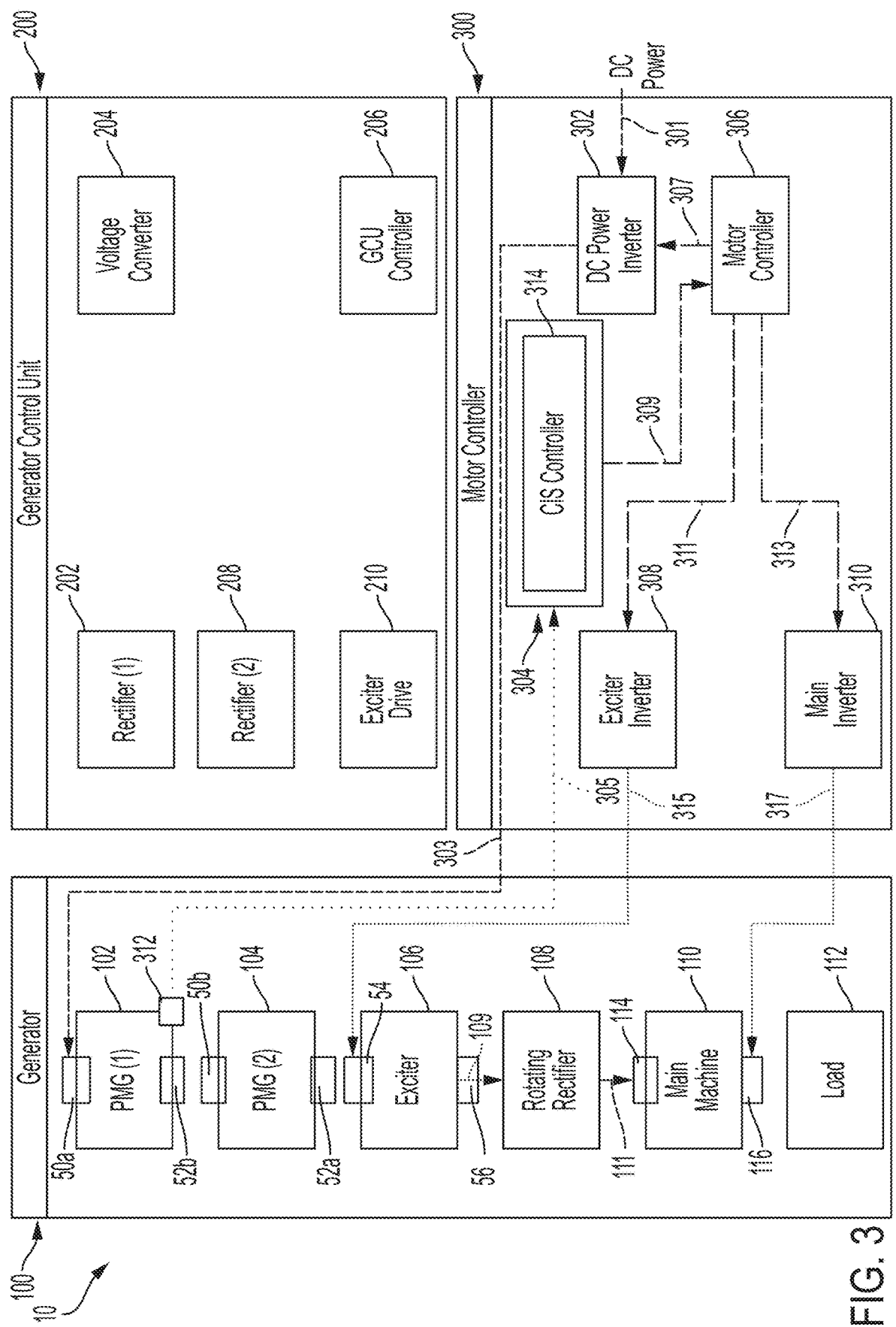
FIG. 3 illustrates the electric power generation and start system of FIG. 1 operating in a start mode according to a non-limiting embodiment of the present disclosure.

Turning to FIG. 3, the EPGSS 10 is illustrated operating in a start mode according to a non-limiting embodiment of the present disclosure. As described herein, in order operate the main machine 110 as a variable speed motor drive it is necessary to determine the rotational position of the main rotor (not shown) included in the main machine 110 to control the solid-state power converter to meet motor performance requirements. Thus, rather than rely on a resolver to determine the rotational position of the main rotor 114 during the start mode as in a conventional EPGSS, the EPGSS 10 utilizes a combination of the first PMG 102, the CIS system 304 and the motor controller 306 to determine the main rotor rotational position.

In response to initiating the start mode, the motor controller 306 outputs a DC inverter control signal 307 that commands the DC power inverter to converter the input DC power signal 301 into the position sensing excitation signal 303, which is delivered to the first PMG 102. The position sensing excitation signal 303 energizes the PMG stator included in the first PMG 102, which in turn induces rotation of the PMG rotor included in the first PMG 102. Accordingly, one or more of the CIS sensors 312 output the sensor signals 305 indicative of the measured voltage and/or current corresponding to the first PMG 102.

The CIS controller 314 digitally processes the voltage and/or current measurements 305 to determine the rotational position of the main rotor 114. As described herein, the CIS controller 314 can identify specific harmonic currents in the first PMG 102 based on the voltage and/or current measurements 30 that are indicative of rotor position information associated with the first PMG 102, and in turn can determine a relative difference between the position of the main rotor 114 relative to the position of the PMG rotor in the first PMG 102.

The motor controller 306 is in signal communication with the CIS controller 314 and receives a rotor position signal 309 indicative of the rotational position of the main rotor 114. Based on the rotational position of the main rotor, the motor controller 306 determines the correct levels of electrical current for energizing the exciter 106 and the main machine 110. For example, based on the position of the main rotor, the motor controller 306 generates an exciter drive control signal 311 and a main inverter control signal 313. In one or more non-limiting embodiments, the exciter drive control signal 311 and the main inverter control signal 313 are PWM signals that control the timing and frequency of switching inverter circuits included in the exciter drive control signal 311 and a main inverter control signal 313. Accordingly, the exciter inverter 308 generates a first AC excitation signal 315 based on the exciter drive control signal 311 and the main inverter 310 generates a second AC excitation signal 317 based on the main inverter control signal 313.

The main stator 116 realizes AC excitation based on the second AC excitation signal 317 delivered by the main inverter 310. Likewise, the exciter stator included in the exciter 106 realizes AC excitation based on the first AC excitation signal 315 delivered by the exciter inverter 308, and in turn energizes the exciter rotor at zero speed (i.e., at startup) to generate the AC power signal 109. As described herein, the AC power signal 109 is rectified to generate the rectified DC signal 111, which is used to energize the main rotor 114 and produce the torque necessary to induce rotation of the shaft 101 and gas turbine engine at zero speed (i.e., at start up).

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft electric power generation and start system (EPGSS) comprising:
    a main machine configured to selectively operate in a start mode or a generator mode, the main machine including a main stator and a main rotor configured to rotate along with a shaft;
    a starter permanent magnet generator (PMG) electrically connected to a first rectifier, the starter PMG including a first PMG stator and a first PMG rotor configured to rotate along with the shaft;
    a generator permanent magnet generator (PMG) electrically connected to a second rectifier, the generator PMG including a second PMG stator and a second PMG rotor configured to rotate along with the shaft; and
    a system configured to determine one or both of a PMG voltage and a PMG current corresponding to the starter PMG during the start mode, and to determine a rotational position of the main rotor based on one or both of the PMG voltage and the PMG current.

2. The EPGSS of claim 1, wherein the system is a carrier injection sensorless (CIS) system comprising:
    a sensor configured to output a sensor signal indicating one or both of the PMG voltage and the PMG current corresponding to the starter PMG; and
    a CIS controller configured to calculate the rotational position of the main rotor based on one or both of the PMG voltage and the PMG current.

3. The EPGSS of claim 1, wherein the CIS controller is configured to determine multiphase coordinates of a main current flowing through the main stator and the PMG current flowing through the first PMG stator, wherein the main current and the PMG current contain selected harmonics of a CIS frequency and contain rotor position information caused by saliency of the main rotor and the first PMG rotor.

4. The EPGSS of claim 3, wherein the CIS controller is configured to convert the multiphase coordinates of the main current and the PMG current to respective alpha-beta coordinates and to determine a position and angular velocity of the main rotor and the first PMG rotor.

5. The EPGSS of claim 4, wherein the CIS controller determines a relative position between the main rotor and the first PMG rotor based on the position and the angular velocity, and a main rotor position of the main rotor is determined based on the relative position between the main rotor and the first PMG rotor.

6. The EPGSS of claim 5, wherein the first PMG stator and the first PMG rotor are mechanically timed to a known position relative to the main rotor and the main stator to determine the relative position.

7. The EPGSS of claim 5, wherein an initial position sensing algorithm determines the relative position.

8. The EPGSS of claim 4, wherein the CIS controller is configured to execute a CIS algorithm that calculates the position and the angular velocity of the main rotor and the first PMG rotor based at least in part on the alpha-beta coordinates.

9. The EPGSS of claim 1, further comprising a motor controller in signal communication with the CIS system, the motor controller configured to control excitation of the main stator and the first PMG stator based at least in part on the rotational position of the main rotor.

10. The EPGSS of claim 1, wherein the starter PMG outputs a first AC power signal to the first rectifier during the generator mode, and wherein the generator PMG output a second AC power signal to the second rectifier during the generator mode independently from the first AC power signal.

11. The EPGSS of claim 10, wherein the first rectifier generates a first DC power signal based on the first AC power signal, and wherein the second rectifier generates a DC exciter signal based on the second AC power signal.

12. A method of controlling an aircraft electric power generation and start system (EPGSS), the method comprising:
   selectively operating a main machine in one of a start mode or a generator mode, the main machine including a main stator and a main rotor configured to rotate along with a shaft;
   operating a starter permanent magnet generator (PMG) electrically connected to a first rectifier, the starter PMG including a first PMG stator and a first PMG rotor configured to rotate along with the shaft; and
   operating a generator permanent magnet generator (PMG) electrically connected to a second rectifier, the generator PMG including a second PMG stator and a second PMG rotor configured to rotate along with the shaft;
   determining, by a system, one or both of a PMG voltage and a PMG current corresponding to the starter PMG during the start mode;
   determining, by the system, a rotational position of the main rotor based on one or both of the PMG voltage and the PMG current.

13. The method of claim 12, wherein the system is a CIS system in signal communication with a sensor configured to output; a sensor signal indicating one or both of the PMG voltage and the PMG current corresponding to the starter PMG; and
   wherein the system includes a CIS controller configured to output the rotational position of the main rotor based on one or both of the PMG voltage and the PMG current.

14. The method of claim 12, further comprising determining, by the CIS system, multiphase coordinates of a main current flowing through the main stator and the PMG current flowing through the first PMG stator, wherein the main current and the PMG current contain selected harmonics of a CIS frequency and contain rotor position information caused by saliency of the main rotor and the first PMG rotor.

15. The method of claim 14, further comprising:
   converting, by the CIS controller, the multiphase coordinates of the main current and the PMG current to respective alpha-beta coordinates; and
   determining, by the CIS controller, a position and angular velocity of the main rotor and the first PMG rotor.

16. The method of claim 15, further comprising:
   determining, by the CIS controller, a relative position between the main rotor and the first PMG rotor based on the position and the angular velocity; and
   determining, by the CIS controller, a main rotor position of the main rotor is determined based on the relative position between the main rotor and the first PMG rotor.

17. The method of claim 16, further comprising determining the relative position by mechanically timing the first PMG stator and the first PMG rotor to a known position relative to the main rotor and the main stator.

18. The method of claim 16, further comprising determining the relative position using an initial position sensing algorithm.

19. The method of claim 15, further comprising executing, by the CIS controller, a CIS algorithm that calculates the position and the angular velocity of the main rotor and the first PMG rotor based at least in part on the alpha-beta coordinates.

20. The method of claim 12, further comprising:
   controlling, by a motor controller in signal communication with the CIS system, excitation of the main stator and the first PMG stator based at least in part on the rotational position of the main rotor;
   outputting, from the starter PMG, a first AC power signal to the first rectifier during the generator mode;
   outputting, from the generator PMG, a second AC power signal to the second rectifier during the generator mode independently from the first AC power signal;
   generating, by the first rectifier, a first DC power signal based on the first AC power signal; and
   generating, by the second rectifier, a DC exciter signal based on the second AC power signal.

* * * * *